United States Patent [19]

Bolton et al.

[11] Patent Number: 5,782,493
[45] Date of Patent: Jul. 21, 1998

[54] ROAD TRAILER

[75] Inventors: Garth Desmond Bolton; Peter Bennetto, both of Sandton; Derick Garzancich, Johannesburg, all of South Africa

[73] Assignee: GFLT Developments (PTY) Limited, Johannesburg, South Africa

[21] Appl. No.: 541,884

[22] Filed: Oct. 10, 1995

[30] Foreign Application Priority Data

Oct. 7, 1994 [ZA] South Africa ............... 94/7855

[51] Int. Cl.[6] .................................................. B60P 3/24
[52] U.S. Cl. ..................... 280/837; 280/831; 220/563; 220/564
[58] Field of Search ............................. 280/837, 831, 280/838, 839, 789; 220/562, 563, 564, DIG. 24

[56] References Cited

U.S. PATENT DOCUMENTS

| | | | |
|---|---|---|---|
| 764,390 | 7/1904 | Stoller et al. | 280/639 |
| 1,815,625 | 7/1931 | Kramer. | |
| 2,536,263 | 1/1951 | Cellwork | 280/5 |

FOREIGN PATENT DOCUMENTS

| | | | |
|---|---|---|---|
| 1 091 454 | 4/1955 | France. | |
| 39 26 448 | 2/1991 | Germany. | |
| 40 06 005 | 8/1991 | Germany. | |
| 41 28 971 | 3/1993 | Germany. | |
| 582 943 | 8/1993 | Germany. | |
| 583914 | 10/1958 | Italy | 280/831 |
| 559 933 | 4/1944 | United Kingdom. | |
| 736757 | 9/1955 | United Kingdom | 280/838 |
| 926449 | 5/1963 | United Kingdom | 280/838 |
| 1 180 153 | 2/1970 | United Kingdom. | |
| 1 527 799 | 10/1978 | United Kingdom. | |

*Primary Examiner*—Brian L. Johnson
*Assistant Examiner*—Avraham Lerner
*Attorney, Agent, or Firm*—Foley & Lardner

[57] ABSTRACT

A road trailer for carrying both fluid and dry freight which includes an elongated bulk liquid tank which is clad with sheet metal and has a flat base surface which is stepped across its length from a forward low volume zone of the tank to a lower second level, high volume tank zone, a first pair of parallel spine beams which extend over the length of the tank and are attached to its upper surface cladding, a second pair of parallel spine beams which extend over the length of the tank, and follow the stepped contour of the base surface cladding and are again stepped upwardly to project rearwardly from the high volume zone of the tank, vertical planar spacer elements which are located in and spaced over the length of the tank and are fixed directly to the second pair of spine beams and the inner surface walls of the tank cladding, a load deck arrangement over the upper outer surface of the tank, a hitch device on the underside of the low volume zone of the tank, and a wheel and suspension arrangement which is attached to the rearwardly projecting portions of the second pair of spine beams.

10 Claims, 5 Drawing Sheets

ROAD TRAILER

FIELD OF THE INVENTION

This invention relates to a road trailer for carrying general freight such as metal and timber products, consumer goods and building materials and so on as well as any form of fluid such as liquids, gas and particulate material and to a two trailer combination.

BACKGROUND TO THE INVENTION

In most countries a road mass limit is imposed on all heavy duty road transportation vehicles with the limit being made up of the mass of the entire vehicle i.e. mechanical horse and trailer and the mass of its cargo or payload. It follows therefore, that if the mass of the vehicle can be reduced, the payload and so the economic efficiency of the vehicle will proportionally be increased. To this end relatively light tanker trailers are known which include tanks which are made from aluminium. These aluminium tanks are, in all cases known to the applicant, supported on a conventional heavy metal beam chassis.

Another problem associated with tanker transportation of bulk liquids is the inevitable requirement that the tanks on the trailers be dedicated to only one, or at best a small range of compatible liquids. While certain industries will tolerate a tanker cleaning program to allow the tanker to backload compatible products, for example, wine backloaded with methylated spirits; diesel fuel backloaded with solvent et cetera, and by so doing to operate at lower rates, other industries insist on the dedication of tankers for the transport of liquid food products, that can be easily contaminated, aviation fuel that is subject to strict quality control, and so on.

Even in industries where compatible liquids may be backloaded the expensive cleaning programs required of these tankers adds considerably to tanker down time, and hence transport costs.

In an attempt to increase the productivity of heavy duty tanker trailers, and particularly dedicated trailers, trailers have in the past been built with general freight load decks on the upper surfaces of the liquid tanks for the purpose of backloading freight. To the best of the applicant's knowledge all trailers of this type are constructed from conventional metal alloys and suffer the limitation that the tanks are supported, as mentioned above, on or by conventional heavy metal chassis assemblies which are at or above the wheel height of the trailer. The mass of dry freight that is transportable by means of these trailers is limited as the center of gravity of the backload goods on the empty tanker is unusually high up on the trailer resulting in poor roll stability and handling of the trailer in use.

SUMMARY OF THE INVENTION

A road trailer for carrying both fluid and dry freight according to the invention comprises:

(a) an elongated bulk liquid tank which is clad with sheet metal and has a substantially planar upper surface and a substantially flat base surface which is stepped across its length from a first level, forward low volume zone of the tank to a lower second level, high volume tank zone, which is situated between front and rear wheels which support the trailer in use, (b) a first pair of parallel spine beams which extend over the length of the tank and are attached to its upper surface cladding.

(c) a second pair of parallel spine beams which; extend over the length of the tank, are fixed directly to and follow the stepped contour of the base surface cladding of the tank and are again stepped upwardly from the second tank level to project rearwardly from the high volume zone of the tank.

(d) vertical planar spacer elements which; are located in and suitably spaced over the length of the tank and are fixed directly to the second pair of spine beams and the inner surface of the tank cladding.

(e) a load deck arrangement which is fixed to and extends over the upper outer surface of the tank, (f) a hitch device on the underside of the low volume zone of the tank, and (g) a wheel and suspension arrangement which is attached to the rearwardly projecting portions of the second pair of spine beams.

Preferably all of the tank components are made from aluminium.

The wall cladding of the tank may extend vertically between the upper and base cladding of the tank partially to resist vertical loads imposed on the tank by either liquid in the tank or freight on the load deck of the trailer.

The second pair of spine beams conveniently include gusset arrangements which are integral with the beams and extend from the upper to the lower levels of the beams in the tank over the steps in the beams for the dissipation of stresses in these areas of the tank frame. The tank frame preferably additionally includes a horizontal stiffener plate which extends in the tank from the base of the low volume zone of the tank, across the step in the tank base, and into the high volume tank zone to extend over a portion of the length of the zone with the stiffener plate being fixed to the second pair of spine beams and the inner surfaces of the side wall cladding of the tank for the same purpose as the gusset arrangements.

The spacer elements may include solid compartment forming bulkheads and intermediate holed baffle plates with each spacer element including a T-shaped peripheral rim with the cross member of the rim being welded along both edges on opposite sides of the spacer element to the inner surface of the tank cladding and the second pair of the spine beams.

In one form of the trailer of the invention the upwardly stepped and rearwardly projecting portions of the second pair of spine beams are each part of a substantially Y-shaped frame member with one of the splayed legs of the Y-shaped frame members being integral with the portion of the beam in the second level of the tank and the other being fixed to a rear end of one of the first pair of spine beams with the single legs of the Ys forming the rearwardly projecting portions of the beams. A fifth wheel coupler is located on the rearwardly projecting portion of the second pair of spine beams. The cladding at the rear end of the high volume tank zone is preferably outwardly curved and the Y-shaped frame members include complementally shaped webs between the splayed legs of the Y-shaped frame member to which the curved tank cladding is welded.

In a second form of the trailer of the invention the tank includes, to the rear of its high volume zone a second low volume zone which is attached to the rearwardly projecting portions of the second pair of spine beams with its upper surface coextensive with the upper surface of the remainder of the tank.

BRIEF DESCRIPTION OF THE DRAWINGS

Two embodiments of the trailer of the invention are now described by way of example only with reference to the drawings in which:

FIG. 2 is a perspective view from above of the tank of the front trailer of FIG. 1 with its outer cladding removed, FIG. 3 is a perspective view from above of the lower spine beam arrangement of the FIG. 1 trailer.

DETAILED DESCRIPTION OF THE INVENTION

Figure 1:
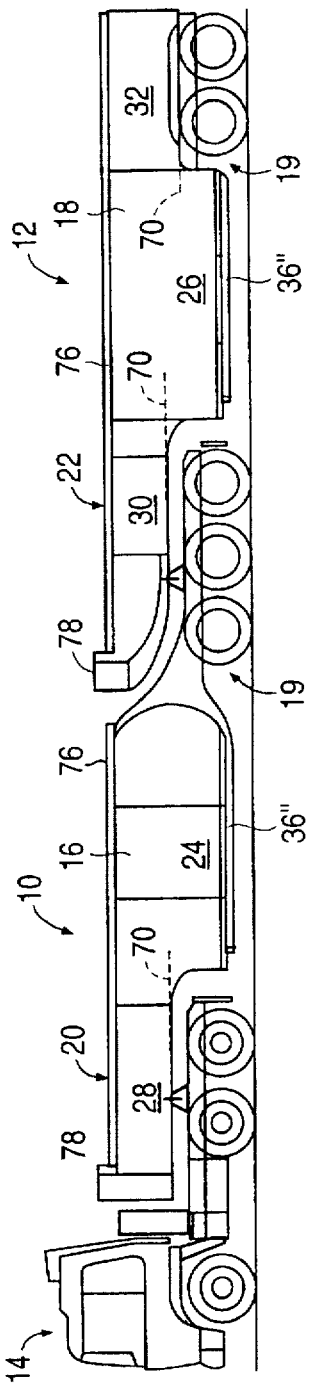
FIG. 1 is a side elevation of two of the trailers of the invention connected in tandem to a truck tractor.

The general freight and tanker trailer rig of the invention is shown in FIG. 1 to include, in tandem, a front trailer 10, a rear trailer 12 and a truck tractor 14 for towing the two trailers. The trailers are connected to one another and the tractor by means of conventional fifth wheel couplers. The trailers 10 and 12 each include low-profile bulk liquid tanks 16 and 18 respectively and flat bed general freight decks 20 and 22. The trailer wheel sets 19 are conventional and are mounted on the rear portion of the trailers through inflatable air cushion suspension arrangements which are adapted to raise and lower the rear ends of the trailers to facilitate effective and complete liquid unloading.

In order to maximize available space between the wheel sets of the FIG. 1 rig and to achieve as low a profile as possible to accommodate freight on the decks 20 and 22 of the trailers without sacrificing tank volume, the trailer tanks 16 and 18 are rectangular in cross-section and have central downwardly stepped high liquid volume zones indicated generally at 24 and 26 respectively. A major advantage provided by the downwardly stepped tank design is the significant lowering of the center of gravity of the trailer which ensures its roll stability with a liquid load but more especially with a loaded freight deck in use.

Although both trailers of FIG. 1 will be described in detail below they are merely separate embodiments of the trailer of the invention and the FIG. 1 trailer rig could include only the trailer 12 which will be coupled directly to the truck tractor 14.

Figure 6:
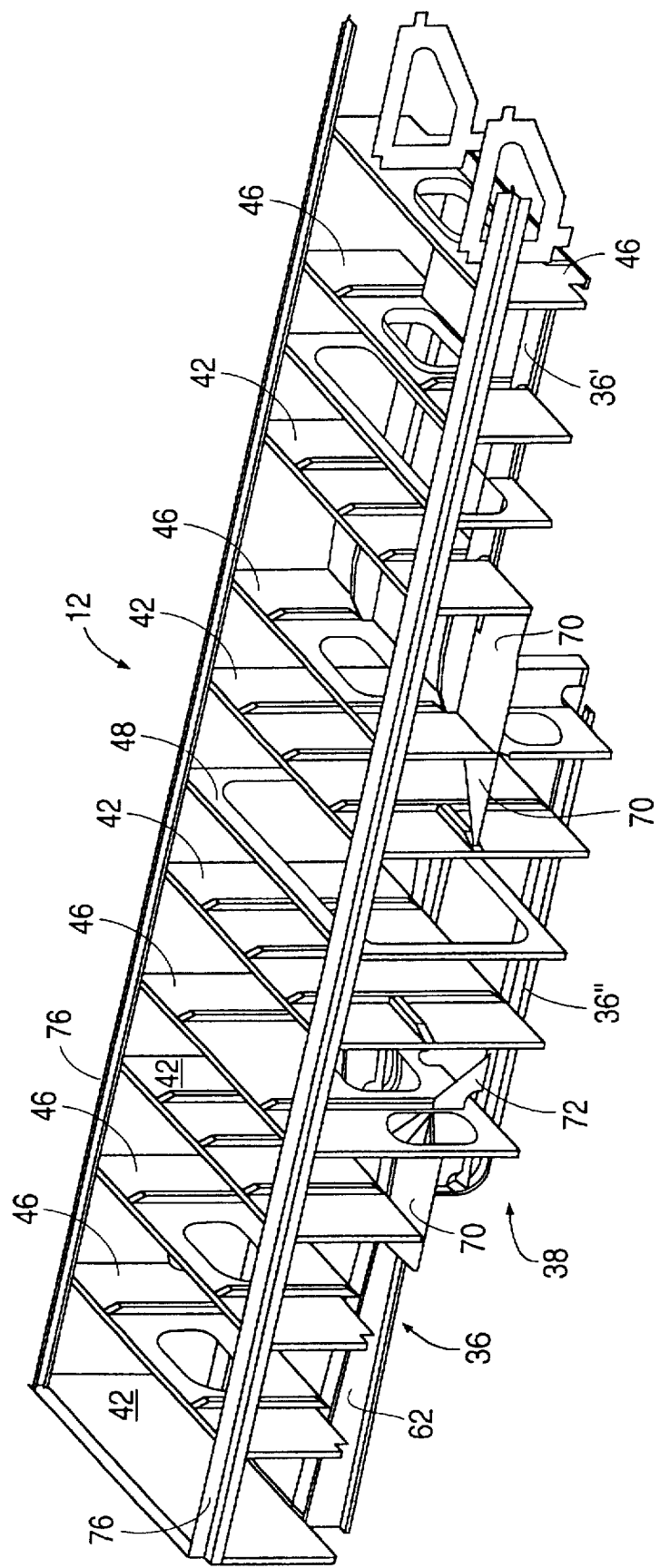
FIG. 6 is a perspective view from above of the rear trailer of FIG. 1 with its outer cladding removed.

Referring to FIGS. 1, 2 and 6, the trailer 10 includes a single relatively smaller liquid volume zone 28 ahead of its high volume zone 24 and the trailer 12 relatively smaller liquid volume zones 30 and 32 which are situated ahead of and behind its large volume zone 26.

Figure 4:
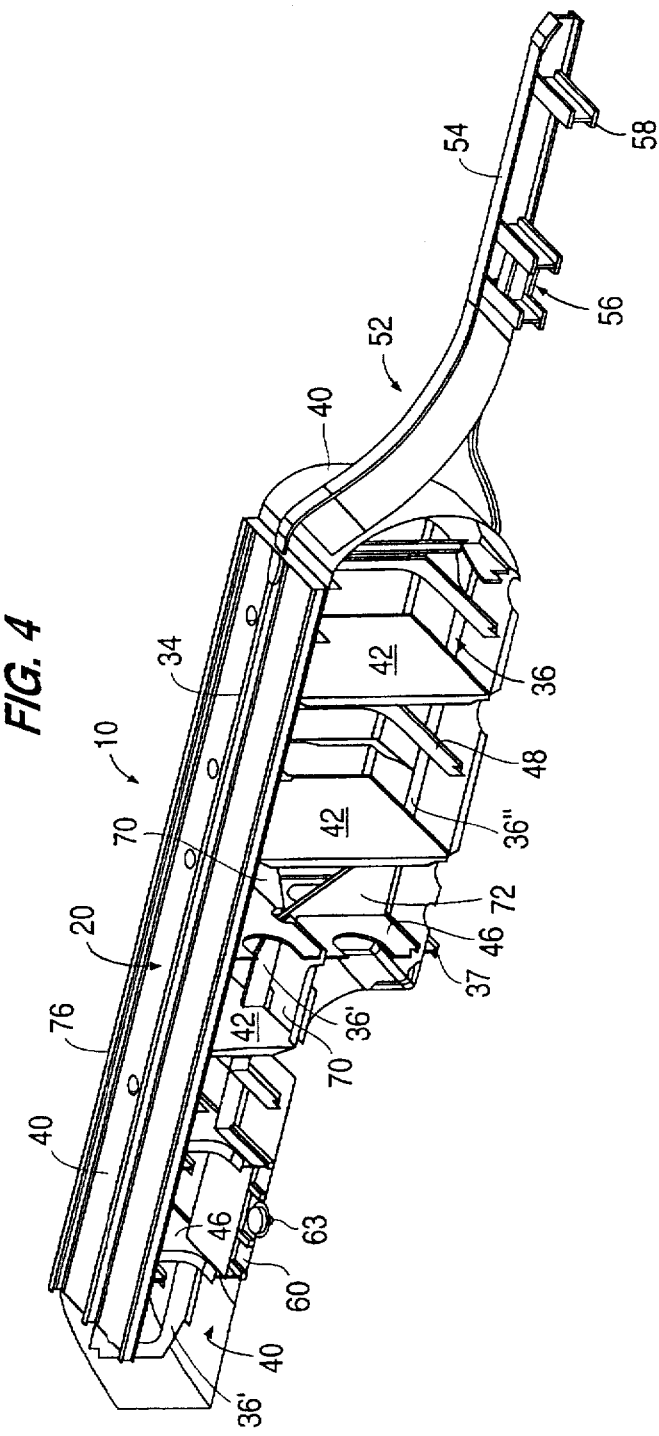
FIG. 4 is a half-sectioned side elevation, in perspective view, of the tank section of the FIG. 2 trailer.
Figure 8:
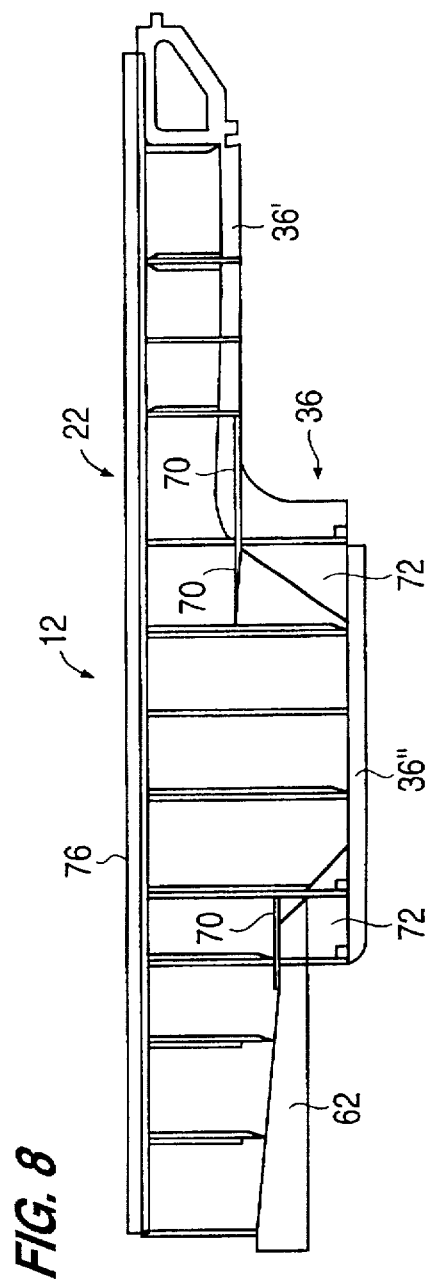
FIG. 8 is a diagrammatic side view of the FIG. 6 trailer with its facing outer cladding removed.

Each of the trailer tanks, as illustrated in FIGS. 2, 4 and 6, are of a monocoque construction which includes pairs of upper and lower horizontal spine beams 34 and 36, a series of longitudinally spaced vertical spacers 38 which, together with the spine beams, define the tank frame and an outer sheet metal cladding 40 as illustrated in FIGS. 1, 4 and 8. The upper spine beams 34, shown only in FIGS. 2 and 4, of both trailer tank frames, in this embodiment of the invention, are welded to the outer surface of the upper tank cladding and form part of the trailer load decks 20 and 22.

The frame spacers 38 of each of the tanks are composed of bulkheads 42 which divide the tank into separate liquid compartments, baffle plates 46 and ring stiffeners 48 which are located in the tank frames between the upper base and side wall cladding of the tank.

The forward portions of the lower spine beams of the tank each include a forward beam component 36' which has a downwardly directed rear portion which, in cross-section has the shape of an inverted T, and a base beam 36" which is I-shaped in cross-section and is welded to the forward beam 36'. A robust jacking beam 37, which includes reinforced jack pads, bridges and is fixed to the forward ends of the beam components 36". The jacking beam is used, with small portable hydraulic jacks, to support the forward end of the trailer when unhitched and eliminates the need for the conventional heavy landing legs which are used for this purpose.

Figure 9:
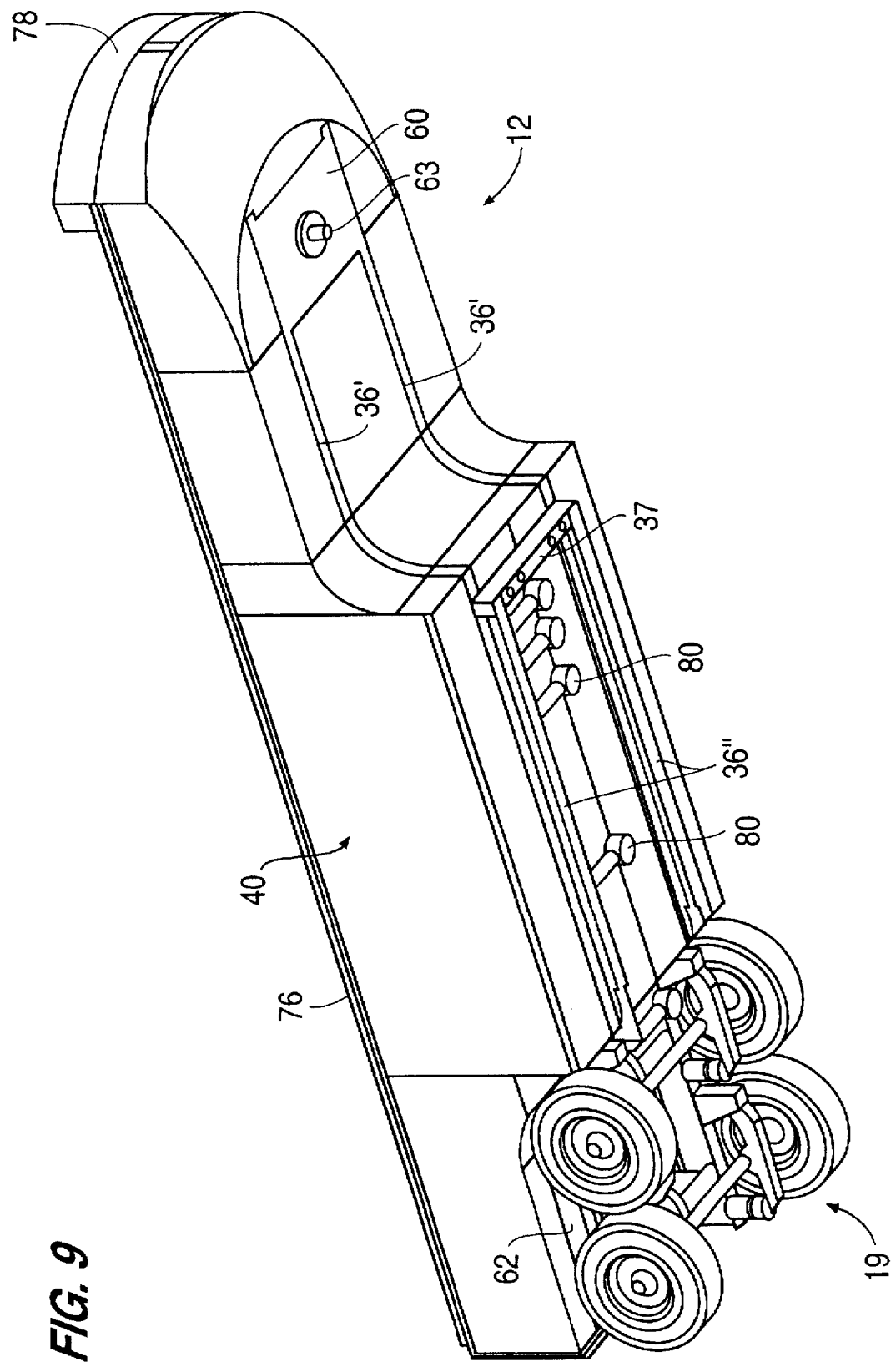
FIG. 9 is a perspective view from below of the rear trailer of FIG. 1.

The tank frame of the trailer 10 includes a frame yoke 52, as shown in FIGS. 2 and 3, which includes two Y-shaped frame members 54 with the single legs of the Y-shaped frame members held spaced apart by a fifth wheel cross member assembly 56 and a robust rear cross member 58. The spacing between the frame members 54 corresponds to the horizontal spacing of the spine beams 34 and 36 as shown in the drawings. The lower splayed legs of the Y members 54 are made integral, by welding, with and form part of the lower spine beams 36. The upper spine beams 34 are welded to the ends of the upper splayed legs of the Y-shaped frame members, as shown in FIG. 4, when the upper cladding of the tank, which provides the base of the load deck 20, is welded in place. The domed rear end of the high volume zone cladding of the tank is nested in and welded to the curved inner edges of the yoke arms, as shown in FIG. 4. The undersides of the rearwardly projecting portions of the frame members 54 carry hanger and air bag brackets, not shown, for location of the wheel set 19. The lower spine beam components 36' are separated by and fixed to a kingpin box assembly 60, which carries a downwardly projecting coupler kingpin 63 which is shown only in FIGS. 4 and 9.

The forward portion of the lower spine beam of the trailer 12 is substantially identical to that of the trailer 10 with the beam components 34' and 34" being the same as the components 36' and 36" of the trailer 10.

Figure 7:
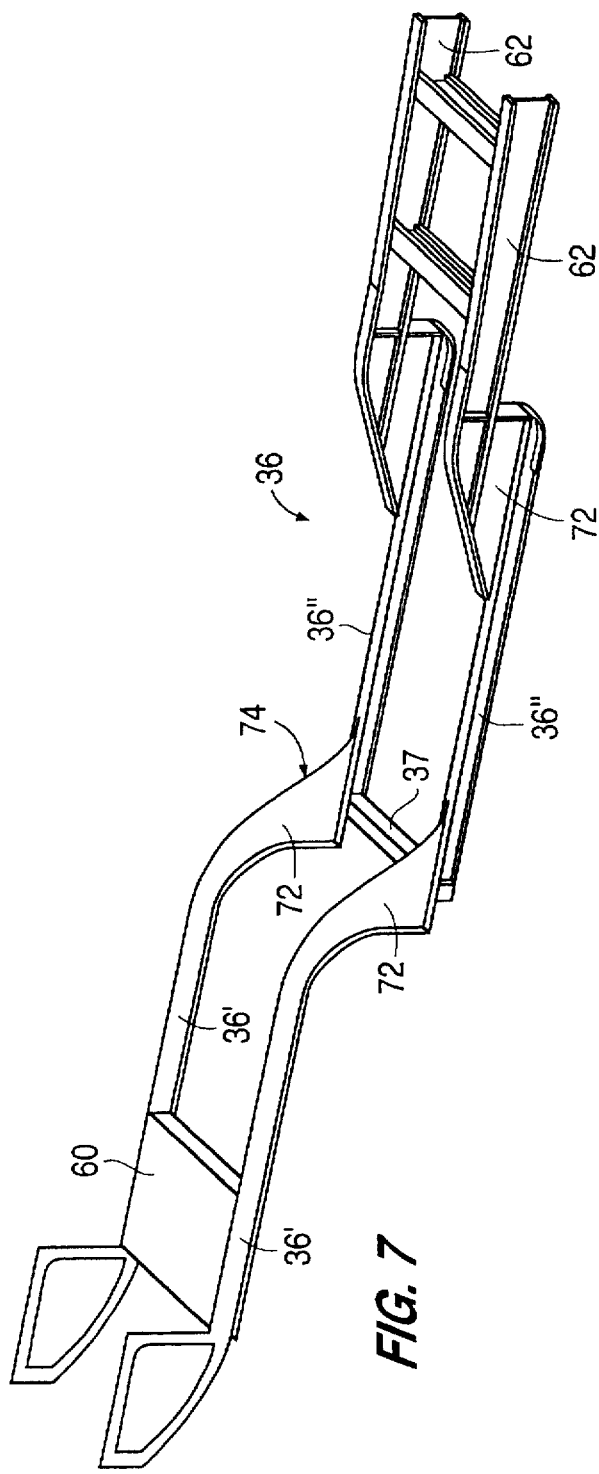
FIG. 7 is a perspective view from above of the lower spine beam arrangement of the trailer of FIG. 6.

The rear end of the trailer 12 includes two wheel support beams 62 which are welded to the lower spine beams 36" of the tank frame and are held spaced apart by suitably spaced cross members, as shown in FIG. 7. The underside of the beams 62 each carry suspension and air bag hanger brackets, not shown, to which the wheel set 19 of the trailer is attached. As with the trailer 10, the trailer 12 includes a kingpin box assembly 60 which is located between and spaces the forward portions of the lower spine beams 36.

As mentioned in the preamble to this specification the economic efficiency of a trailer and particularly a tanker trailer for carrying liquids is dependent largely on its empty mass/liquid capacity ratio, and to optimise this efficiency the entire trailer of the invention and its components, other than some running gear and coupling components are made from aluminum. The illustrated trailers weighs approximately 2,300 kg when empty, without running gear i.e.: axles, wheels, tires, suspension and braking systems, and have a bulk liquid capacity of 26,000 and 32,500 liters respectively for the front and rear trailers. To achieve these design parameters of mass and load a conventional heavy steel beam chassis is totally eliminated from the design with the required structural strength of the trailers being achieved entirely by their monocoque construction.

It is an international requirement that large volume liquid road tankers must be capable of withstanding up to a 2 g downward or vertical, a 2 g longitudinal and a 1 g lateral force to cater for accident and heavy braking situations which may cause the tank of the trailers to rupture.

Figure 5:
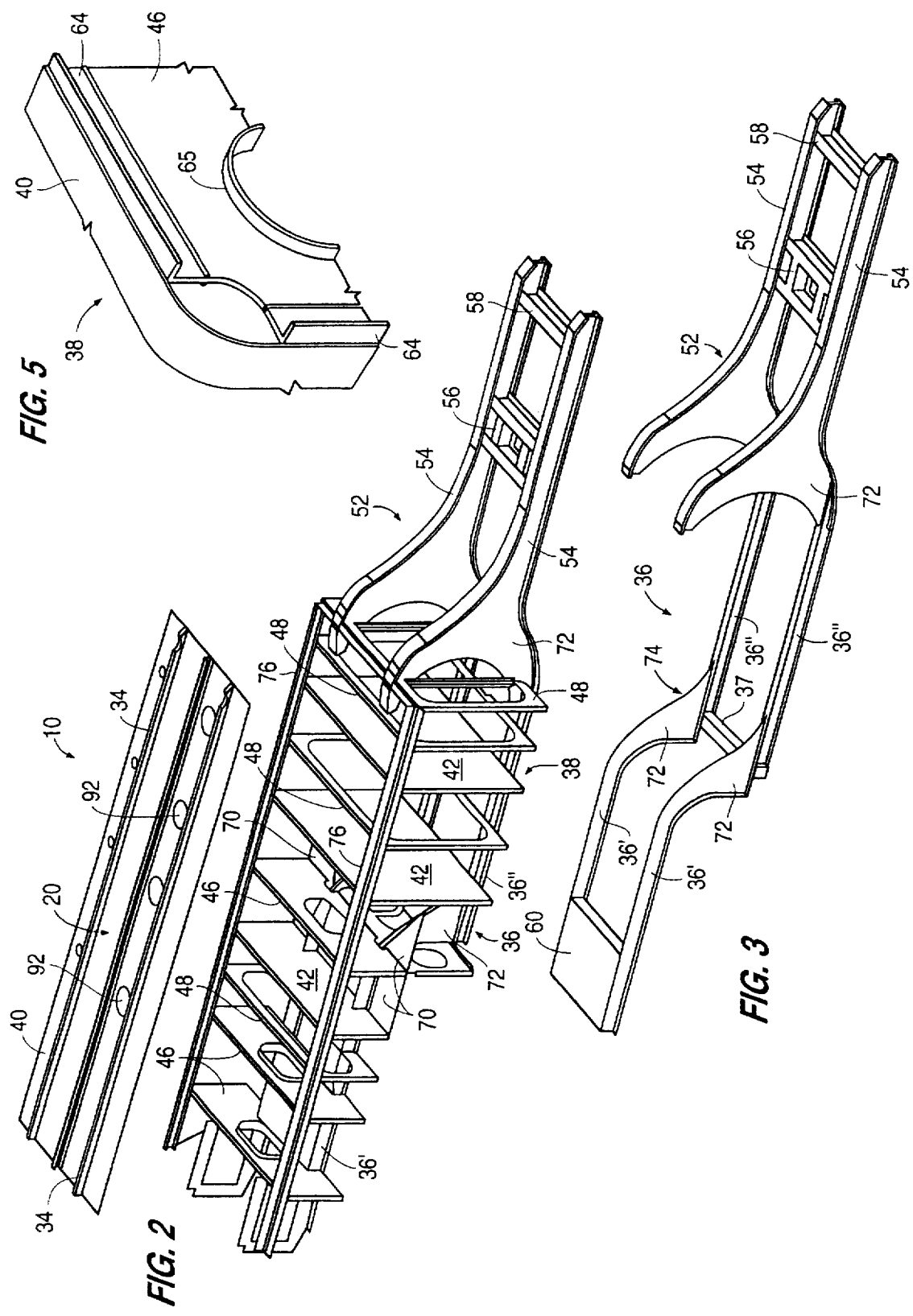
FIG. 5 is a fragmentary perspective view of a corner of a baffle plate for use in the trailer tanks of the invention.

To achieve the above stringent dynamic load requirements with the monocoque construction of the tanks of the invention, while supported only at their two ends by the fifth wheel coupler and the rear wheel set, substantial use is made in the construction of the tank of extruded I and T-shaped load-spreading aluminium extrusions. As illustrated in FIG. 5 the numerous vertical spacer plates 38 each carry a T-shaped extrusion 64 which surrounds and is welded to its periphery. All of the baffle plates of the tanks are inwardly radiused at their corners as shown in the drawing to provide liquid drainage through the baffles between the bulkheads at the lower corners of the tanks and vapor equalization in the upper portions of the tanks' compartments.

All of the spacer plates 38 are welded to the lower spine beam 36 and in an embodiment of the trailer where the upper spine beams 34 are to be attached to the under surface of the deck 20, to those beams also. The forward portions 36' of the spine beams 36 are, as shown in FIG. 4, welded to the inner surface of the tank cladding with their vertical webs slotted into and welded to the spacers 38. The base cladding in the drop bottom high volume portions of the tanks is welded to the upper flange of the I-beams 36" with the lower portions of the beams, as is clearly seen in FIG. 1, serving as skid rails for the trailers.

The aluminium cladding 40 is laid over the frame as illustrated in FIGS. 4 and 8 with adjacent sheets of cladding being anchor-welded to each other and the central portions of the cross members of the T-shaped spacer extrusions 64 as illustrated in FIG. 5. The radius of curvature of the cladding on all corners of the tank is about 50 mm. The use of the T-shaped connectors to join the skin of the tanker cladding to the frame over a relatively wide area results in connection welding of the cladding to the T-shaped extrusions in three positions i.e., an anchor weld externally between and to the two sheets of cladding and the cross members of the Ts and two internal structural welds at the outer edges of the T cross members to the inner surface of the cladding. This fixing arrangement enables stress to be transferred more readily to the tank skin at these points. The different heat-affected zones that arise from the four welds between the extrusions 64, the cladding and the spacers 38 are fairly remote from one another and the generally accepted heat-affected zones do not overlap to compromise the tensile strength of the profiled extrusions or the cladding. Additionally, the anchoring of the spacers 38 to the cladding on either side of the vertical plate, spreads the stress in the connection at this location and therefore provides better anchorage for the spacers against counter stresses which may arise from the surge of liquid cargo in the tank during acceleration or deceleration of the trailer.

The cladding 40 of the tanks of the trailers is unusually thick, about 4.5 mm, and as much as 12.5 mm in the transition or downwardly stepped zones of the tanks. The spacers 38 have a thickness of about 6 mm. The thickness of the cladding and spacer material together with the vertically planar stiffeners 38 and side wall cladding lends considerable rigidity to the tanks and their vertical and horizontal load support capability without unduly compromising the low mass requirement of the trailers. The thicker cladding material in the downwardly stepped transition areas between the deep and shallow tank zones of the trailers additionally assists in dissipating the exceptionally high stress loads encountered in these zones of the tanks in use. Furthermore, the mass of the lower spine beam arrangement 36, and the heavier cladding at the base of the trailer holds the center of gravity of the trailer with an empty liquid tank and a dry freight load on its load deck as low as possible.

The holes in the baffle plates 46 are necessary to facilitate ongoing inspection and routine cleaning of the inside of the tanks. To counter high stresses which would otherwise occur in and tend to cause the collapse of the holed baffles, flanges 65, as illustrated in FIG. 5, are welded onto the inner edges of the baffle holes to counter the high stresses in the baffles, and in turn to strengthen the baffles. In critical stress areas such as kingpin box areas, and so on, the bottom portions of the baffle hole flanges 65 are significantly wider and more robust than the flanges in the upper portions of the holes.

An important feature of the tanks of the trailers of the invention, from a structural point of view, are horizontal stiffener plates 70, FIGS. 2, 4, 6 and 8, which counteract, by energy dissipation, unacceptably high stress concentrations in the transition areas where the vehicle undersides are stepped downwardly in height from the shallow tanker zones to the high liquid volume zones and vice versa. The stiffener plates 70 are necessary at the front step or transition zone of the trailer 10 and in both the front and rear transition zones of the trailer 12. A stiffener plate 70 is unnecessary at the rear of the tank of the trailer 10 as the excessive stress which is generated in this area is accommodated by the substantial frame yoke 52. The stiffeners 70 are made from 10 mm plate and span the entire inside width of the tanks on either side of an intermediate baffle 44. The stiffeners are, as illustrated in the drawings and in dotted lines in FIG. 1, positioned on the same plane as the base of the low liquid volume zones of the tanks and extend across the transitional step areas between the shallow and deep tank sections. The stiffener plates 70 are welded to and act as an extension of the floor of the shallow parts of the tank with their outwardly tapered portions in the high liquid volume tank zones being welded to the inner surfaces of the side walls of the tank cladding 40. The plates 70 are additionally welded to both sides of the spacers 38, which they traverse, and the spine beams 36. As mentioned above the stiffeners 70 disperse a large proportion of the stress which would otherwise have been generated in the transition areas of the tanks away from the transition areas into the walls of the deeper tank sections.

The lower spine beams 36 of the tank frame include gusset-like formations 72 which are most clearly seen in FIGS. 3 and 7, further to effect the smoothest possible transfer of stress across the right angled transition areas of the tank. To provide the gussets the webs of the spine beams 36, the yoke members 52 and the wheel support beams 62 have been significantly deepened in these areas with the forward gussets being smoothly curved as shown at 74 in FIGS. 3 and 7. The combined stress dissipating effect of the stiffener plates 72 and the smooth flowing shape of the spine beam gussets 72 together with the substantially thicker cladding in these areas cope more than adequately with the high stresses generated in these areas in use.

The freight decks 20 and 22 of the trailers are substantially identical and are illustrated only in FIG. 2. The deck load frame consists of a number of longitudinal beams including the spine beams 34 which are fixed to the tank upper surface, and, in some applications, may include frame laterals which transversely span the upper surface of the tank 18 at spaced intervals with the spacing between the longitudinal beams and laterals being determined by the anticipated mass of the load to be transported on the deck. The ends of the laterals, if used, are fixed to robust top corner extrusions 76 which serve as additional stiffener frame beams which extend over the length of the trailer and carry load locks for securing load straps for holding a load on the trailer decks 20 and 22 in place. The forward end of the load deck terminates in a storage box 78 for carrying tools, spares, hydraulic jacks and so on for the trailer.

The trailers each also obviously include conventional manholes 92 which are seen in FIG. 2 and foot valves 80 for liquid drainage as shown in FIG. 8.

The invention is not limited to the precise details as herein described. For example the load decks of the trailers can be varied by the inclusion of side uprights, solid timber or plywood decking and so on to cater for a particular freight load to be carried by the trailers.

We claim:

1. A road trailer for carrying fluid and dry freight including:
    (a) an elongated bulk liquid tank which is clad with sheet metal and has a substantially planar upper surface and a substantially flat base surface which is stepped across its length from a first level, forward low volume zone of the tank to a lower second level, high volume tank zone, which is situated between front and rear wheels which support the trailer in use,
    (b) a first pair of parallel spine beams which extend over the length of the tank and are attached to its upper surface cladding,
    (c) a second pair of parallel spine beams which; extend over the length of the tank, are fixed directly to and follow the stepped contour of the base surface cladding of the tank and are again stepped upwardly from the second tank level to project rearwardly from the high volume zone of the tank,
    (d) vertical planar spacer elements which; are located in and suitably spaced over the length of the tank and are fixed directly to the second pair of spine beams and the inner surface of the tank cladding,
    (e) a load deck arrangement which is fixed to and extends over the upper outer surface of the tank,
    (f) a hitch device on the underside of the low volume zone of the tank, and
    (g) a wheel and suspension arrangement which is attached to the rearwardly projecting portions of the second pair of spine beams.

2. A road trailer as claimed in claim 1 in which all of the tank components are made from aluminium.

3. A road trailer as claimed in claim 1 in which the side wall cladding of the tank extends vertically between the upper and base cladding of the tank.

4. A road trailer as claimed in claim 1 in which the second pair of spine beams includes gusset arrangements which are integral with the beams and extend from the upper to the lower levels of the beams in the tank over the steps in the beams.

5. A road trailer as claimed in claim 4 including a horizontal stiffener plate which extends in the tank from the base of the low volume zone of the tank, across the step in the tank base, and into the high volume tank zone to extend over a portion of the length of the zone with the stiffener plate being fixed to the second pair of spine beams and the inner surfaces of the side wall cladding of the tank.

6. A road trailer as claimed in claim 1 in which the spacer elements include solid compartment forming bulkheads and intermediate holed baffle plates with each spacer element including a T-shaped peripheral rim with the cross member of the rim being welded along both edges on opposite sides of the spacer element to the inner surface of the tank cladding and the second pair of the spine beams.

7. A road trailer as claimed in claim 1 in which the upwardly stepped and rearwardly projecting portions of the second pair of spine beams are each part of a substantially Y-shaped frame member with one of the splayed legs of the Y-shaped frame member being integral with the portion of the beam in the second level of the tank and the other being fixed to a rear end of one of the first pair of spine beams with the single legs of the Y-shaped frame member forming the rearwardly projecting portions of the beams.

8. A road trailer as claimed in claim 7 including a fifth wheel coupler which is located on the rearwardly projecting portion of the second pair of spine beams.

9. A road trailer as claimed in claim 8 in which the cladding at the rear end of the high volume tank zone is outwardly curved and the Y-shaped frame members include complementally shaped webs between the splayed legs of the Y-shaped frame member to which the curved tank cladding is welded.

10. A road trailer as claimed in claim 1 in which the tank includes, to the rear of its high volume zone a second low volume zone which is attached to the rearwardly projecting portions of the second pair of spine beams with its upper surface coextensive with the upper surface of the remainder of the tank.

* * * * *